US 6,588,708 B2

(12) United States Patent
Wang et al.

(10) Patent No.: US 6,588,708 B2
(45) Date of Patent: Jul. 8, 2003

(54) SPACECRAFT METHODS AND STRUCTURES FOR ACQUIRING AND DETERMINING POWER-SAFE ATTITUDES

(75) Inventors: Grant Wang, Hacienda Heights, CA (US); Yeong-Wei Wu, Rancho Palos Verdes, CA (US); Rongsheng Li, Hacienda Heights, CA (US); David D. Needelman, Torrance, CA (US)

(73) Assignee: The Boeing Company, Seattle, WA (US)

( * ) Notice: Subject to any disclaimer, the term of this patent is extended or adjusted under 35 U.S.C. 154(b) by 34 days.

(21) Appl. No.: 09/771,916

(22) Filed: Jan. 29, 2001

(65) Prior Publication Data

US 2003/0029970 A1 Feb. 13, 2003

(51) Int. Cl.$^7$ ................................................ B64G 1/36
(52) U.S. Cl. .......................... 244/171; 244/168; 244/164
(58) Field of Search ................................. 244/165, 164, 244/171, 169, 168, 173; 701/13

(56) References Cited

U.S. PATENT DOCUMENTS

| | | | |
|---|---|---|---|
| 5,020,744 A | 6/1991 | Schwarzschild | 244/164 |
| 5,255,879 A | 10/1993 | Yocum | 244/171 |
| 5,412,574 A | 5/1995 | Bender | 364/455 |
| 5,508,932 A | * 4/1996 | Achkar et al. | 244/171 |
| 5,597,142 A | 1/1997 | Leung | 244/164 |
| 5,826,828 A | * 10/1998 | Fowell et al. | 244/164 |
| 5,865,402 A | 2/1999 | Fischer | 244/166 |
| 5,919,314 A | * 7/1999 | Kim | 244/173 |
| 6,019,320 A | * 2/2000 | Shah et al. | 244/171 |

* cited by examiner

Primary Examiner—Galen L. Barefoot
(74) Attorney, Agent, or Firm—Gates & Cooper LLP

(57) ABSTRACT

The present invention is directed to spacecraft that have, for any reason, lost the spacecraft's service attitude that permits it to carry out the service operations for which it was designed. The invention provides methods and structures for acquiring and determining a power-safe attitude (i.e., one in which wing current is sufficient to support the spacecraft's housekeeping operations) from which the spacecraft can be subsequently returned to a service attitude. The methods are particularly useful because they a) require only a single star tracker for sensing attitude, comprise simple maneuvers, and typically acquire a power-safe attitude that does not significantly differ from the spacecraft's service attitude to thereby reduce the spacecraft's return-to-service time.

35 Claims, 9 Drawing Sheets

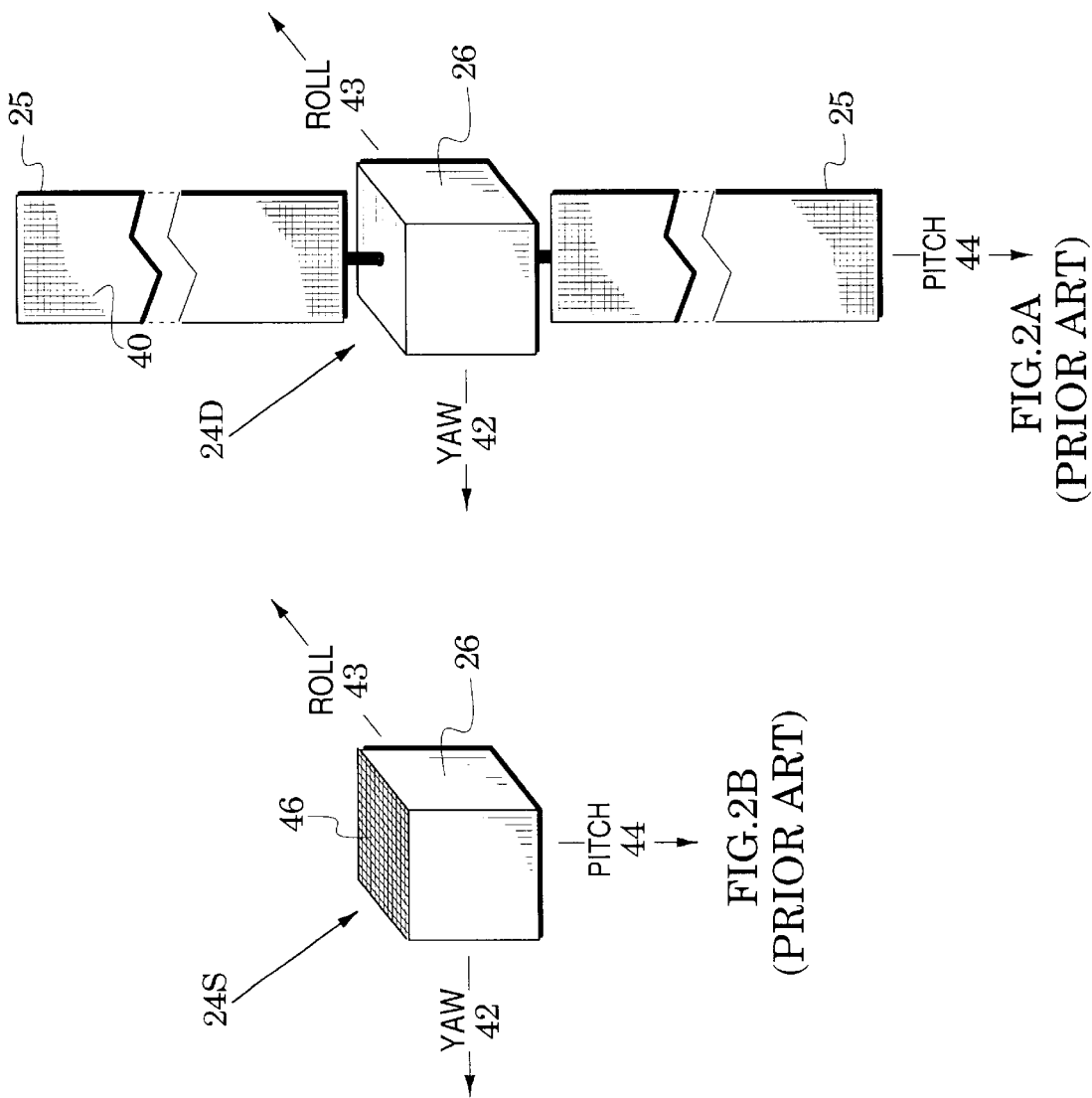

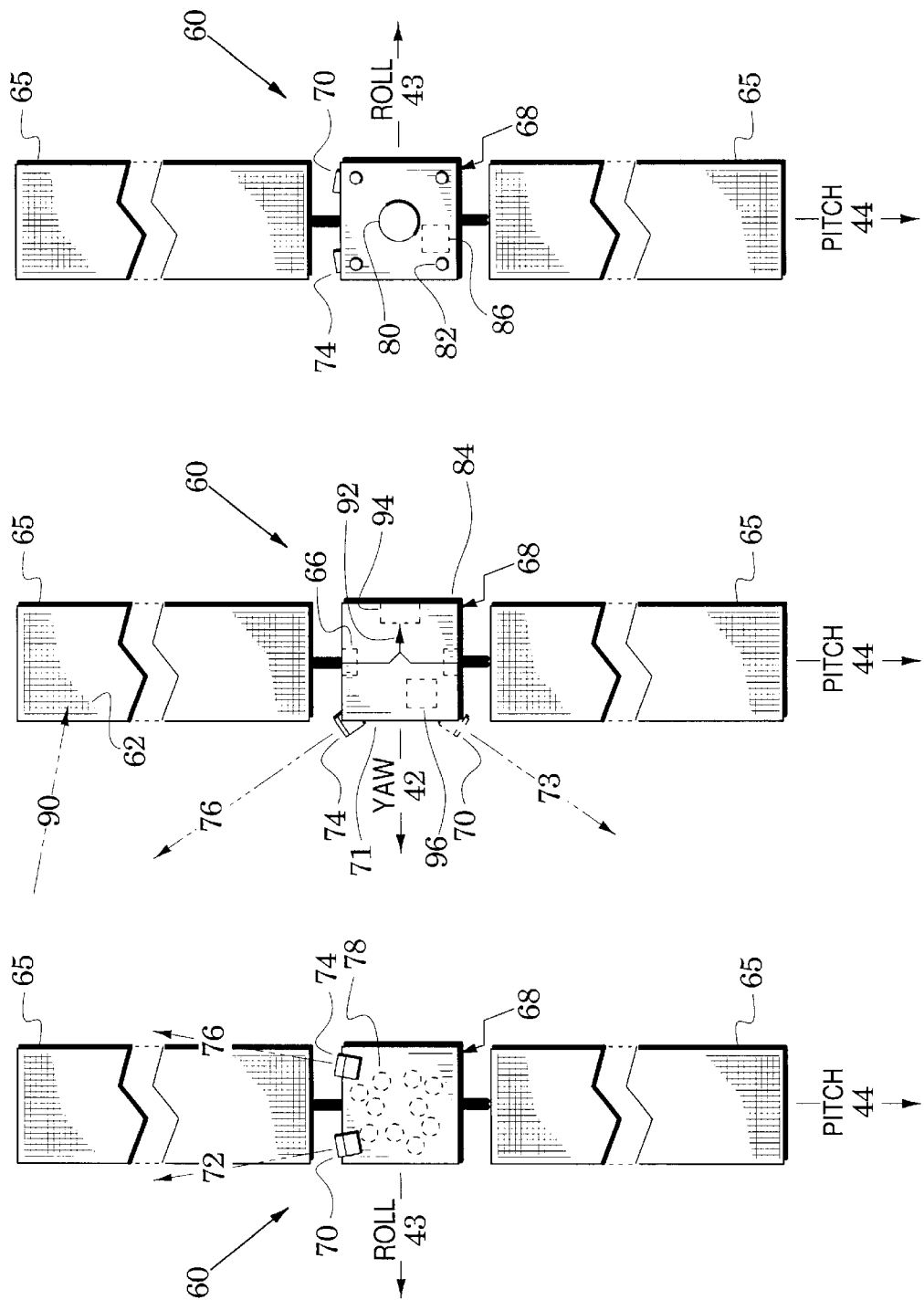

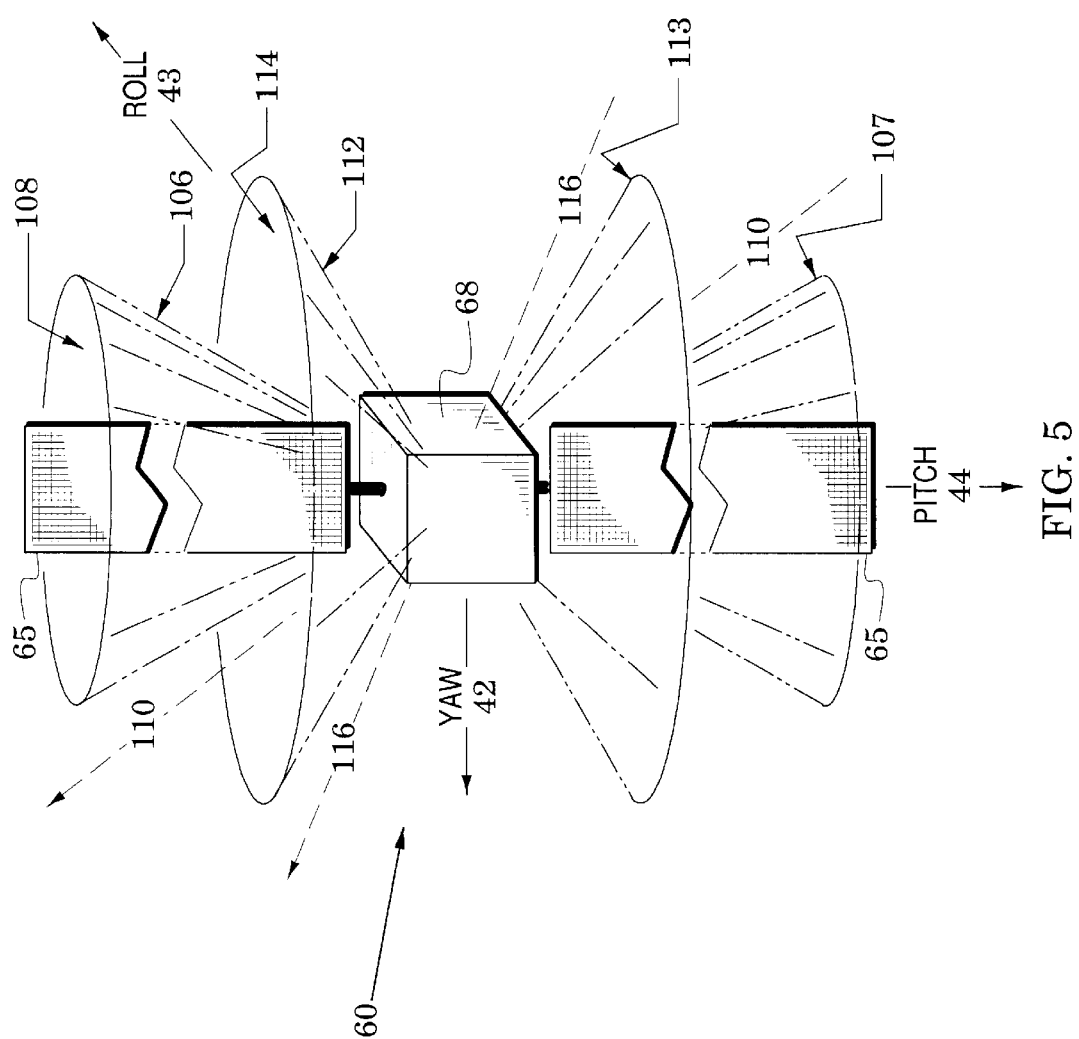

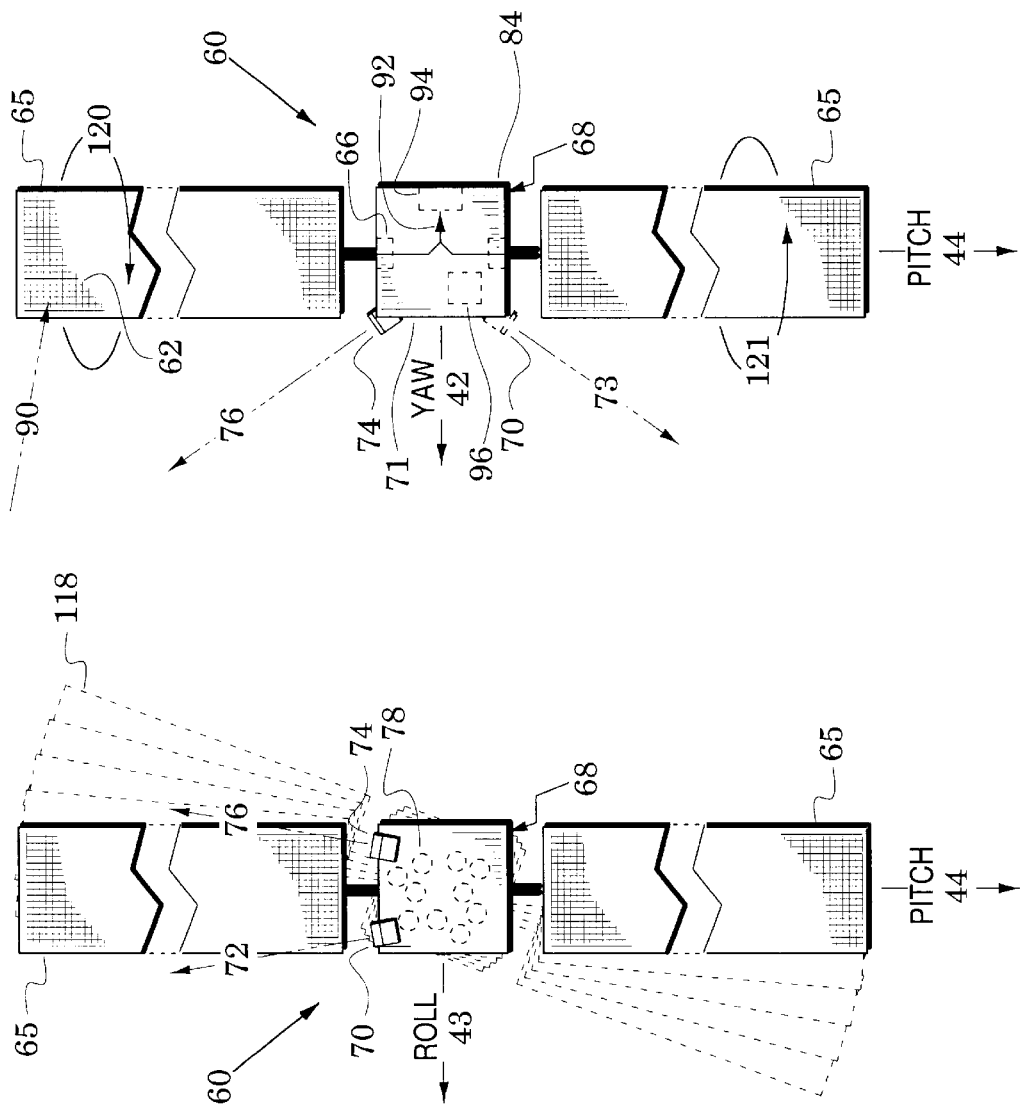

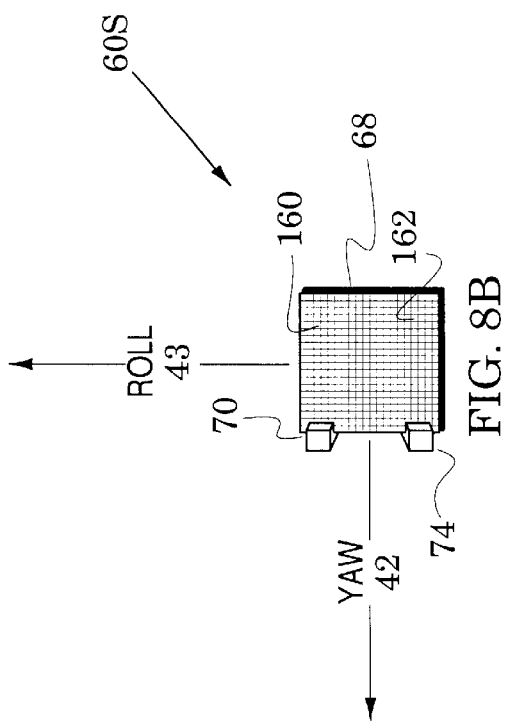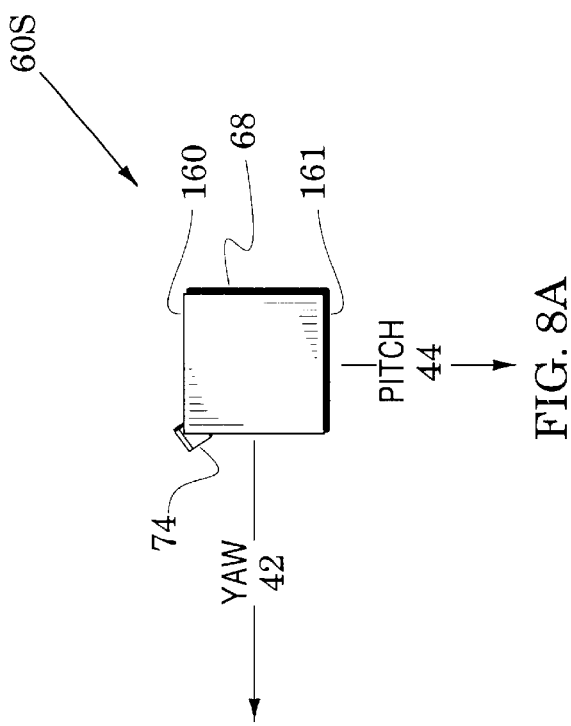

SPACECRAFT METHODS AND STRUCTURES FOR ACQUIRING AND DETERMINING POWER-SAFE ATTITUDES

BACKGROUND OF THE INVENTION

1. Field of the Invention

The present invention relates generally to spacecraft and, more particularly, to acquiring and determining spacecraft attitudes.

2. Description of the Related Art

FIG. 1 is a diagram 20 that illustrates exemplary orbits of a spacecraft about an Earth 22. The spacecraft is shown both as a spacecraft 24D with its solar wings 25 in a deployed configuration wherein they extend from its body 26 and as a spacecraft 24S with its solar wings in a stowed configuration wherein they adjoin the body. The spacecraft is initially launched along a launch path 27 into a parking orbit 28 prior to its installation into a final orbit such as a geosynchronous orbit (GEO) 30. Transfer between the parking orbit 28 and the GEO 30 is realized along transfer orbits such as exemplary transfer orbits 32 and 34.

The elliptical transfer orbit 32 has a perigee 36 tangent to the parking orbit 28 and an apogee 37 tangent to the GEO 30. Insertion of the spacecraft into and out of the transfer orbit 32 is typically accomplished with a motor that is generally referred to as an apogee motor which is of a motor type (e.g., solid propellant motor and bi-propellant liquid motor) that can realize a large thrust for a short time. The apogee motor is fired at the perigee 36 to attain a spacecraft velocity appropriate at that altitude for the transfer orbit 32 and is fired again at the apogee 37 to attain a spacecraft velocity appropriate at that altitude for the GEO 30.

Because the apogee motor does not require large amounts of electrical power, the solar wings 25 are typically in a stowed configuration during the transfer orbit 32 and are then extended into a deployed configuration in the GEO 30. The stowed configuration also protects the fragile solar wings from the acceleration of the apogee motor and from contamination by propellants of the apogee motor.

In contrast to the transfer orbit 32, the transfer orbit 34 has an apogee 38 whose altitude exceeds that of the GEO 30. This transfer orbit is typically converted to the GEO 30 by continuous firing of a low thrust engine such as an ion propulsion thruster. A thruster of this type must generate large electrostatic fields over long periods of time and, accordingly, the solar wings are in their deployed configuration during the transfer orbit 34 to provide the necessary electrical power. They are not in danger of being damaged during this transfer because the ion thrust is extremely low.

The attitude of the spacecraft 24D is typically defined with reference to a body-fixed system of three orthogonal axes which are shown in the enlarged view of FIG. 2A to be a yaw axis 42, a roll axis 43 and a pitch axis 44. The axes are fixed relative to the spacecraft's body 26 and their arrowheads indicate the generally-accepted positive directions of the axes. The solar wings 25 extend from opposite sides of the body 26, rotate about the pitch axis 43 and carry an array 40 of solar cells on one surface to facilitate power generation. Because the solar wings generally have considerable length, they are illustrated in a shortened form in FIG. 2A.

When the spacecraft is in the GEO 30 of FIG. 1, its attitude must be carefully controlled to maintain it in a "service attitude" that permits it to carry out the service operations for which it was designed. An exemplary service attitude directs the yaw axis 42 at the Earth 22 with the roll axis 43 in the plane of the GEO and the pitch axis 44 orthogonal to the GEO plane.

Various anomalies in a spacecraft's attitude control system can cause it to depart from its service attitude and, further, to take on an unknown attitude in which its attitude sensors (e.g., star trackers) fail to provide attitude information. To prevent failure of the spacecraft and its operations, the spacecraft must promptly acquire an attitude in which its solar wings generate sufficient power to maintain a viable spacecraft. In addition, the spacecraft must determine its attitude so that it can be subsequently urged to its service attitude.

Spacecraft and their operation are generally expensive endeavors so that loss of the service attitude is of great concern. In a communication spacecraft, for example, revenues and customers are lost when the spacecraft's service is interrupted. The spacecraft's "return-to-service" time must be reduced to minimize these costs. When the service attitude is lost, it is therefore important to not only acquire and determine a power-safe attitude but to do it promptly.

Although the term "service" is typically applied to operations conducted in a spacecraft's permanent orbit, it is used herein to also indicate service operations during a preliminary orbit such as the transfer orbit 32 of FIG. 1. When it is in this orbit, the enlarged view of FIG. 2B shows that the solar wings of the spacecraft 24S are stowed to adjoin opposite sides of its body 25 and arranged so that a portion 46, of each solar cell array is parallel to the yaw axis 42. Because the spacecraft can be permanently lost if its attitude is not properly controlled throughout the transfer orbit 32, it is important to promptly acquire a power-safe attitude when in the transfer orbit 32.

Various methods have been proposed for acquiring and determining spacecraft attitudes. A method for determining the instantaneous attitude of a spinning spacecraft, for example, is disclosed in U.S. Pat. No. 5,020,744 (issued on Jun. 4, 1991 to Schwarzschild). The method requires inputs from a sun sensor, an earth sensor and a 3-axis gyroscope assembly. U.S. Pat. No. 5,255,879 (issued on Oct. 26, 1993 to Yocum, et al.) provides a method for directing the roll axis of a spacecraft along the sun line but it requires that a spacecraft carry three single-axis sun sensors.

A method for determining a spacecraft's attitude is provided by U.S. Pat. No. 5,412,574 (issued on May 2, 1995 to Bender, et al.). This method requires a terrestrial sensor (e.g., an earth sensor or a beacon sensor) and at least one star tracker or a cross-link sensor. U.S. Pat. No. 5,597,142 (issued Jan. 28, 1997 to Leung, et al.) teaches the use of a sun sensor, an earth sensor and a 3-axis gyroscope assembly to obtain a desired spacecraft attitude. Finally, U.S. Pat. No. 5,865,402 (issued Feb. 2, 1999 to Fischer et al.) discloses a method of acquiring a spacecraft attitude with a sun sensor, an earth sensor and a direction vector measurement device such as a star sensor or a magnetometer.

As evidenced in these examples, conventional methods for acquiring and determining spacecraft attitudes have typically:

a) required numerous attitude sensors which must often be added to those used in other spacecraft operations, b) required numerous sequential maneuvers, and c) reached a power, safe attitude that significantly departs from the spacecraft's service attitude and, therefore, lengthens the return-to-service time.

Because weight and space are limited assets in spacecraft and because increased return-to-service time causes loss of revenue, it is of significant importance to provide improved methods for acquiring and determining power-safe spacecraft attitudes.

SUMMARY OF THE INVENTION

The present invention is of particular use in spacecraft that have, for any reason, lost the spacecraft's service attitude that permits it to carry out the service operations for which it was designed. As part of this loss of service attitude, the spacecraft has typically also lost knowledge of its attitude, i.e., it cannot determine its attitude. In these cases, it is imperative that the spacecraft is quickly returned to its service attitude to minimize loss of revenue and, in extreme cases, loss of the spacecraft.

The present invention provides methods and structures for acquiring and determining a "power-safe attitude"—that being an attitude in which wing current is sufficient to support the spacecraft's housekeeping operations and from which, the spacecraft can be subsequently returned to its service attitude.

A method embodiment includes the steps of
 a) at a rotation rate, rotating a solar wing about a wing axis;
 b) at a slew rate that is slower than the rotation rate, slewing the spacecraft about a slew axis that is tilted at least 30 degrees from the wing axis; and
 c) continuing at least one of the rotating and slewing steps to acquire a power-safe attitude in which the wing current exceeds a wing-current threshold and a star tracker's field-of-view contains an identifiable set of stars which determines the power-safe attitude.

Methods of the invention are particularly useful because they:
 a) require only a single star tracker which is an attitude sensor that is often included in a spacecraft for other purposes in such cases, the invention does not require the addition of any sensors,
 b) monitor a simple parameter (i.e., wing current) to determine solar-wing power generation,
 c) comprise simple maneuvers, and
 d) in many cases, acquire a power-safe attitude that does not significantly differ from the spacecraft's service attitude to thereby reduce the spacecraft's return-to-service time.

The novel features of the invention are set forth with particularity in the appended claims. The invention will be best understood from the following description when read in conjunction with the accompanying drawings.

BRIEF DESCRIPTION OF THE DRAWINGS

FIGS. 2A and 2B are enlarged isometric views of a spacecraft of FIG. 1 that respectively show its solar wings in deployed and stowed configurations;

FIGS. 3A–3C are side views of a spacecraft of the invention;

FIG. 5 is an isometric view of the spacecraft of FIGS. 3A–3C which illustrates exclusion areas of a slew axis in the process steps of FIGS. 4A and 4B;

FIGS. 6A and 6B are spacecraft views that are respectively similar to FIGS. 3A and 3B and that illustrate process steps in FIGS. 4A and 4B;

FIG. 8A is a view similar to FIG. 3B that shows a spacecraft with its solar wings in a stowed configuration; and FIG. 8B is a top view of the spacecraft of FIG. 7A.

DETAILED DESCRIPTION OF THE PREFERRED EMBODIMENTS

The present invention is directed to any spacecraft which must be in a service attitude in order to carry out its service operations but which has lost its service attitude and is currently in an unknown attitude. The invention provides methods and structures for acquiring and determining a power-safe attitude that can support the spacecraft's housekeeping operations and that facilitates the subsequent return of the spacecraft to its service attitude so that it can resume its service operations.

Figure 4A:
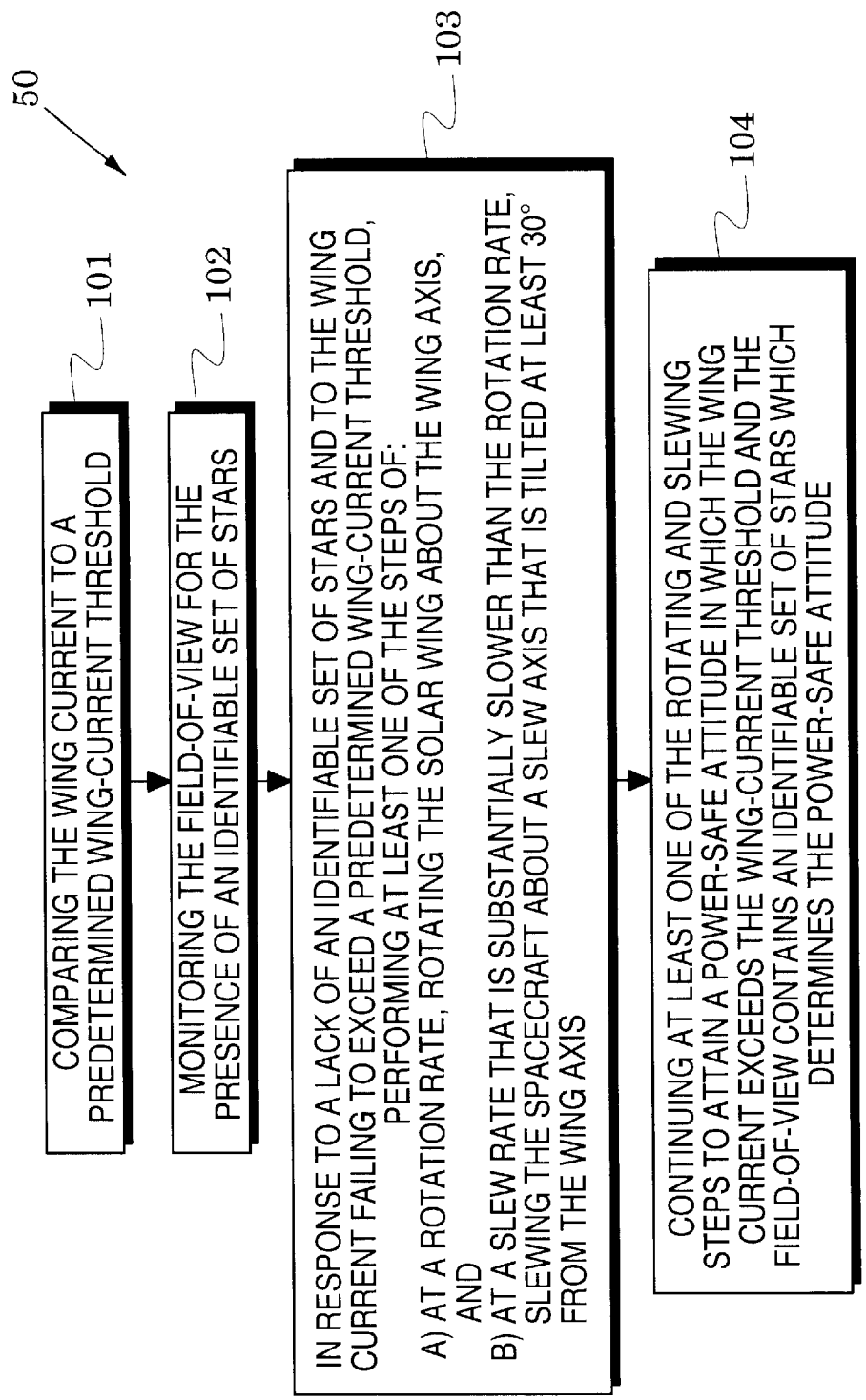
FIGS. 4A and 4B are flow diagrams that illustrate methods of the invention which can be practiced with the spacecraft of FIGS. 3A–3C.
Figure 4B:
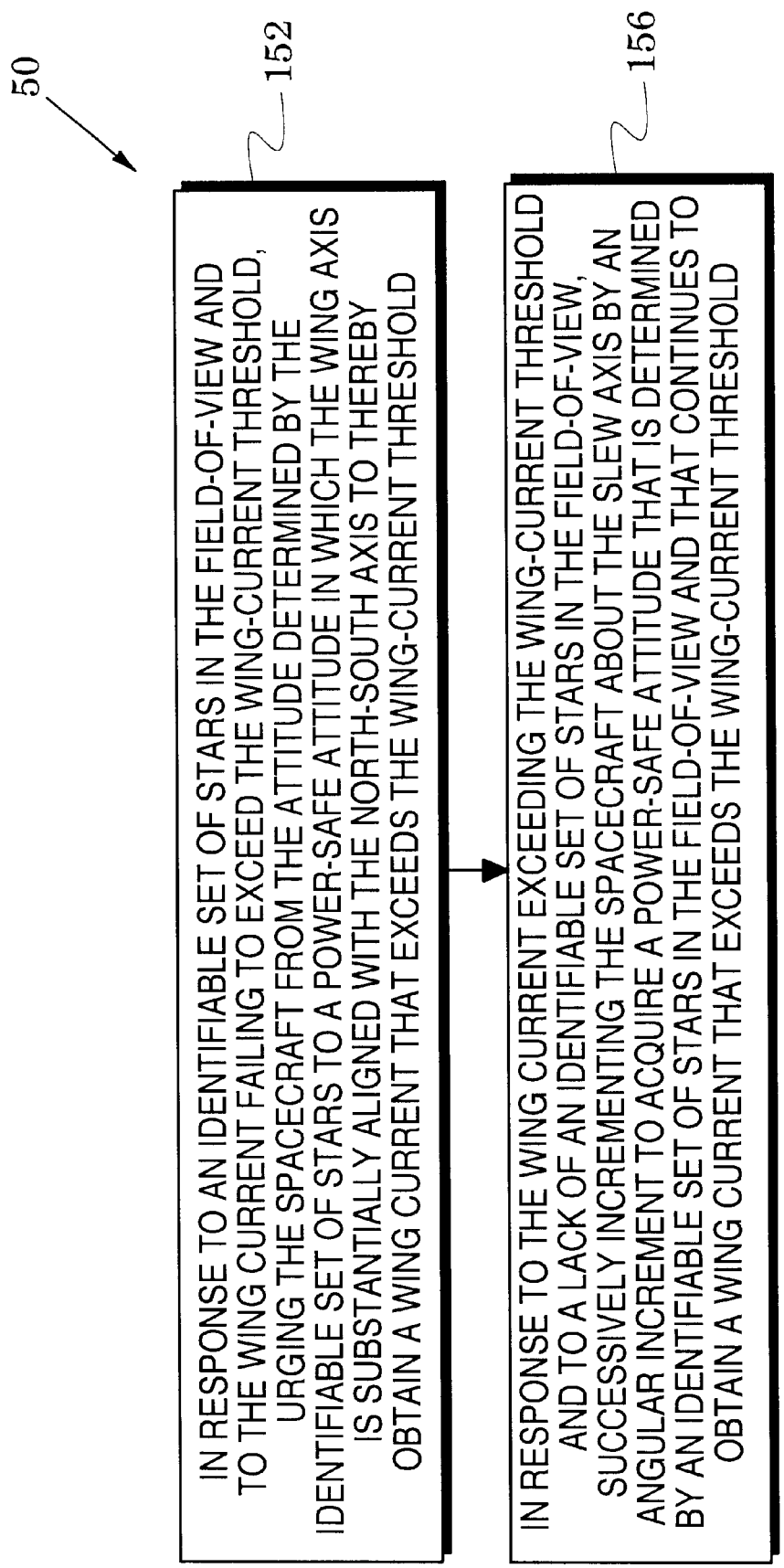

Basic methods of the invention are illustrated in FIGS. 4A and 4B, a spacecraft for practicing these methods is illustrated in FIGS. 3A–3C and FIGS. 5, 6A, 6B, and 7 illustrate the methods as they are applied to the spacecraft. An examination of the methods of the invention is enhanced by preceding it with the following description of the spacecraft 60 of FIGS. 3A–3C.

The three side views of FIGS. 3A–3C show a spacecraft 60 which has solar wings 65 that carry arrays 62 of solar cells. The solar wings extend from rotary actuators 66 on opposite sides of a spacecraft body 68 and the actuators rotate the wings about a pitch axis 44. The solar cell arrays are arranged on one side of each of the solar wings.

A primary star tracker 70 is carried on the body's positive yaw face 71. An exemplary star tracker includes a charge-coupled device (CCD) detector with a field-of-view (e.g., 8°×8°) that is centered on a boresight 72. Although the primary star tracker 70 is sufficient for practicing the methods of the invention, it is preferably backed up with a redundant star tracker 74. Similar to the primary star tracker 70, the redundant star tracker is also carried on the body's positive yaw face 71 and has a boresight 76.

The boresight arrangements of the star trackers 70 and 74 are chosen to reduce intrusion of other spacecraft portions (e.g., solar wings, and antennas) into their fields-of-view. They are also chosen to reduce intrusion of local celestial bodies (e.g., the Earth, sun and moon) into their fields-of-view when the spacecraft is in its service attitude. Intrusion, however, is not limited to direct blocking of the field-of-view as it also results from light that is reflected into the field-of-view. As shown in FIGS. 3A and 3B, the boresights 72 and 76 are preferably tilted up from the yaw-roll plane (e.g., by 55°) and tilted oppositely from the yaw-pitch plane (e.g., by 10°). Although other boresight arrangements can be used for practicing the invention, these have been found to be especially suitable for avoiding intrusion.

The positive yaw face 71 of the body 68 carries a plurality of communication antennas 78 and when the spacecraft 60 is in its service attitude, the yaw axis 43 is oriented towards the Earth to direct the antennas at respective Earth targets. The body also carries thrust generators and torque generators for correcting the spacecraft's orbit and attitude. For example, it carries an apogee motor 80 and ion propulsion thrusters 82 on its negative yaw face 84 and carries momentum wheels 86 internally.

As indicated in FIG. 3B, the solar cell arrays 62 receive solar radiation 90. In response, the arrays generate a wing current 92 that is substantially proportional to the solar radiation that is intercepted by the solar wings. Accordingly, the wing current 92 attains a maximum current when the solar wings 65 are orthogonal to the solar radiation 90. The body 68 carries a power control module 94 which responds to the wing current 92 by generating electrical power for operation of the spacecraft 60. The body 68 also carries a spacecraft control processor 96 which receives attitude signals from the star sensors 70 and 74, monitors the wing current 92 and directs the apogee motor 80, ion propulsion thrusters 82 and momentum wheels 86 so as to control the spacecraft's attitude.

The spacecraft 60 is representative of spacecraft which carry at least one star tracker in order to carryout their service operations. In the spacecraft 60, for example, the star tracker 70 provides stellar position measurements and, in response to these measurements, the spacecraft control processor 96 controls torque generators (e.g., the momentum wheels 86) to direct the communication antennas 78 at respective targets on the Earth.

Having described basic structures of the spacecraft 60, attention is now directed to the flow chart 50 of FIGS. 4A and 4B which illustrates a method for acquiring and determining a power-safe attitude which a) provides sufficient wing current to support the spacecraft's housekeeping operations, and b) facilities an expeditious subsequent return of the spacecraft to its service attitude.

As previously shown in. FIGS. 3A–3C, it is understood that a spacecraft has been provided with a star tracker that has a field-of-view and with at least one solar wing that is rotatable about a wing axis of the spacecraft. It is also understood that the solar wing generates a wing current that is substantially proportional to a solar radiation which is intercepted by the solar wing and that acquires a maximum current when the solar wing is orthogonal to the solar radiation.

In initial process steps 101 and 102 of FIG. 4A, the wing current is compared to a predetermined wing-current threshold and the field-of-view is monitored for the presence of an identifiable set of stars.

In response to a lack of an identifiable set of stars in the field-of-view and to the wing current failing to exceed the wing-current threshold, process step 103 of FIG. 4A requires performance of at least one of the steps of, a) at a rotation rate, rotating the solar wing about the wing axis; and
 b) at a slew rate, slewing the spacecraft about a slew axis that is tilted at least 30 degrees from the wing axis.

Process step 104 continues at least one of the rotating and slewing steps to thereby acquire a power-safe attitude in which the wing current exceeds the wing-current threshold and the field-of-view contains an identifiable set of stars which determines the power-safe attitude. With a power-safe attitude having been acquired and determined, the spacecraft's control processor (96 in FIG. 3B) can now direct torque generators in various conventional ways to urge the spacecraft back to its service attitude.

The slew axis of process step 103 is illustrated in FIG. 5 which shows the spacecraft 60 of FIGS. 3A–3C in an isometric view with like elements indicated by like reference numbers. In particular, FIG. 5 illustrates imaginary exclusion cones 106 and 107 that define the boundary of an internal space 108 which is within 30° of the pitch axis 44. The slew axis that is recited in process, step 103 is positioned outside of the internal space 108 as illustrated by an exemplary slew axis 110.

In other embodiments of the invention, the slew axis is tilted at least 60 degrees from the wing axis (which is coaxial with the pitch axis 44). Corresponding to this embodiment, FIG. 5 illustrates imaginary exclusion cones 112 and 113 that define the boundary of an internal space 114 which is within 60° of the pitch axis 44. In this embodiment, the slew axis of process step 103 is tilted outside of the internal space 114 as illustrate by an exemplary slew axis 116.

Yet other embodiments of the invention preferably tilt the slew axis substantially 90 degrees from the wing axis. Corresponding to this latter embodiment, the slew axis of process step 103 is positioned substantially in the plane defined by the yaw and roll axes 42 and 43 in FIG. 5.

FIGS. 6A and 6B are similar to FIGS. 3A and 3B with like elements indicated by like reference numbers. In an embodiment of the invention in which the slew axis is indeed tilted substantially 90 degrees from the wing axis, FIGS. 6A and 6B illustrate process step 103 of FIG. 4A. It is assumed for illustrative purposes that the slew axis of process step 103 is the yaw axis 42 of FIGS. 5A.

With this assumption, slewing the spacecraft 60 (as recited in process step 103) causes it to successively assume the broken-line positions 118 of FIG. 6A. The step (as recited in process step 103) of rotating the solar wing about the wing axis is exemplarized by the rotation arrow 120 in FIG. 6B. As described below, the wings are preferably initially rotated oppositely as illustrated in FIG. 6B by the oppositely-directed rotation arrow 121.

Process step 104 of FIG. 4A continues the rotating and slewing of process step 103 to acquire a power-safe attitude in which the wing current exceeds a predetermined wing current that is sufficient to support the spacecraft's housekeeping operations. Relationships between the slewing step and wing currents generated by this step are shown in the diagram 130 of FIG. 7.

In particular, the diagram 130 corresponds to embodiments in which the slew axis is tilted substantially 90 degrees from the wing axis. Preferably, the slew rate of process step 104 is substantially slower than the rotation rate. This assures that the solar wings (65 in FIGS. 6A and 6B) are positioned to maximize the wing current for each respective slew position. The rotation rate may, for example, be selected to be substantially ten times the'slew rate. In addition, the slew rate must not exceed the tracking capability of the star tracker (70 in FIG. 3A). In a particular example, the rotation rate may be on the order of 0.5 degree per second and the slew rate on the order of 0.05 degree per second.

The wing current is illustrated in the diagram 130 for several exemplary modes. In a first mode, the sun is assumed to initially lie 90 degrees from the roll-yaw plane. For this mode, the wing current is indicated by the solid-line pattern 131. As shown, the wing current sinusoidally increases from zero (e.g., at a minimum wing current 132) to a peak wing current 134 and then decreases back to zero during 180 degrees of slewing. This pattern is then repeated during each subsequent 180 degrees of slewing.

In a second mode, the sun is assumed to initially lie 45 degrees from the roll-yaw plane. For this mode, the wing current will describe a pattern similar to the solid-line pattern 131 but the minimum wing current will be a function of where the sun lies with respect to a wing-axis plane that is described by the slewed wing axis. If the sun lies in this plane, the wing current will again be described by the solid-line pattern 131. As the sun's position, however, increasingly differs from the wing-axis plane, the minimum wing current 132 increases to a minimum wing current 138 wherein it is 70.7% of the peak wing current 134. Therefore, a family of wing currents will be generated that will begin at the solid-line pattern 131 and increase, as indicated by exemplary broken-line patterns 140 and 141, to a maximum broken-line pattern 142.

Figure 7:
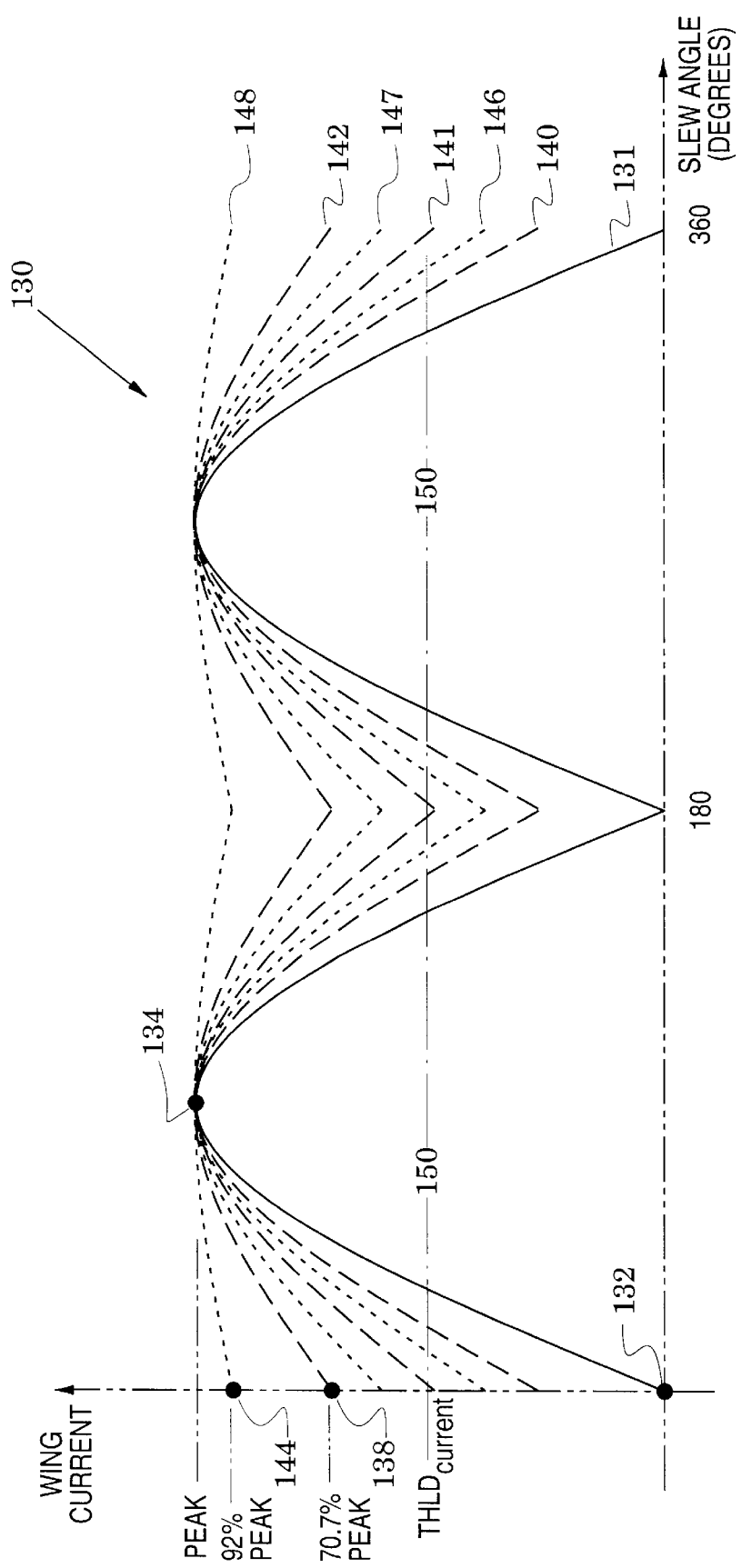
FIG. 7 is a diagram that illustrates wing currents in the process steps of FIGS. 4A and 4B.

In a third mode of FIG. 7, the sun is assumed to initially lie 23 degrees from the roll-yaw plane. For this mode, the wing current will describe patterns similar to those for the second mode but the minimum wing current 132 increases to a minimum wing current 144 wherein it is 92% of the peak wing current 134. Therefore, a family of wing currents will be generated that will begin at the solid-line pattern 131 and increase, as indicated by exemplary broken-line patterns 146 and 147, to a maximum broken-line pattern 148.

From these exemplary families of wing-current patterns, it is apparent that the spacecraft can always be slewed in FIG. 7 to obtain a wing current that exceeds a predetermined wing-current threshold. The threshold that is sufficient to support a spacecraft's housekeeping operations must be determined for each spacecraft in accordance with its housekeeping operations, its payload operations and other operational variables (e.g., inclination of orbit, season of the year, type of spacecraft, systems currently in operation and so on). An exemplary wing-current threshold, however, is the threshold (THLD) 150 that is set, at 50% of the peak current 134 in FIG. 7.

Although it has been determined that sufficient threshold currents can be obtained with a slew axis that is tilted at least 30 degrees from the wing axis, they are more easily obtained when the slew axis is tilted further (e.g., at least 60 degrees or substantially 90 degrees) because greater tilts generally greater ranges of wing currents.

Attention is now redirected to FIG. 4B which illustrates further process steps of the invention. If sufficiently continued, the process step 104 of FIG. 4A will always acquire a power-safe attitude and an identifiable set of stars that will determine this attitude (relative to the celestial system). Process step 152 of FIG. 4B is directed to a case wherein an identifiable set of stars has been obtained but the wing current has yet to exceed the wing-current threshold.

Figure 1:
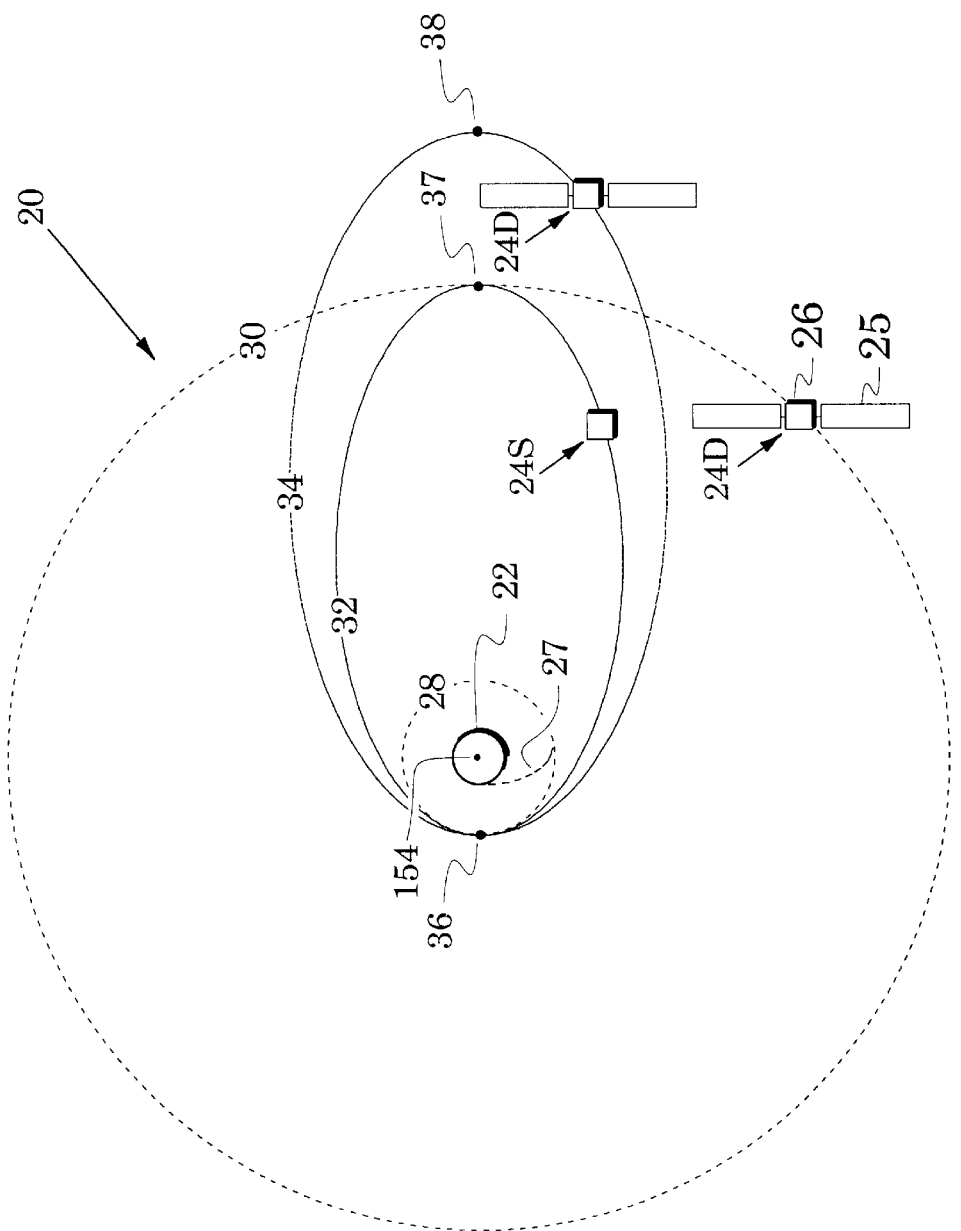
FIG. 1 is a diagram that illustrates various spacecraft orbits about the Earth.

With the spacecraft's attitude determined, step 152 urges the spacecraft to a particular power-safe attitude in which its wing axis is substantially aligned with the north-south axis 154 of the earth 22 of FIG. 1. This maneuver assures that the angle between the wing axis and the solar radiation does not exceed 23 degrees regardless of the season and therefore a wing current can be obtained that is at least 92% of the peak current. In addition, this particular power-safe attitude is close to the service attitude of many spacecraft so that the time for transitioning from this power-safe attitude to the service attitude is reduced.

Process step 156 of FIG. 4B is directed to a case wherein the wing currents exceeds the wing-current threshold but an identifiable set of stars in the field-of-view of the star tracker (70 in FIG. 3A) has yet to be obtained. In this case, the spacecraft is preferably incremented about the slew axis by an angular increment on the order of the field-of-view so as to ascertain if an adjoining field-of-view contains an identifiable set of stars. If not, the spacecraft is successively incremented about the slew axis by an angular increment until a field-of-view is obtained that has an identifiable set of stars.

In another embodiment of the invention, the solar wings are initially rotated in opposite directions. This counter rotation is indicated in FIG. 6B where the upper solar wing 65 rotates as indicated by rotation arrow 120 and the lower solar wing rotates oppositely as indicated by rotation arrow 121. This embodiment may reduce the time required for the solar wings to scan the horizon to find the wing position that provides the maximum wing current at a corresponding slew angle. From any given starting point in FIG. 7, this embodiment essentially proceeds simultaneously in opposite directions along the wing-current profiles. The spacecraft's control processor (96 in FIG. 3B) is preferably provided with a feedback control loop that performs this embodiment so as to automatically rotate the solar wings to obtain the maximum wing current.

Immediately after loss of attitude control, a spacecraft generally has an attitude that is close to its service attitude. For example, the service attitude of the spacecraft 60 of FIGS. 6A and 6B may be one in which the yaw axis 42 is directed at a target on the Earth (e.g., a suborbital point or a beacon) so as to properly direct its communication antennas 78.

Another embodiment of the invention, therefore, selects (in process step 103 of FIG. 4A) a slew axis that is tilted substantially 90° from the wing axis and that, in particular, is coaxial with the yaw axis 42. This embodiment reduces the spacecraft's departure from its current attitude which is probably close to its service attitude. Accordingly, the difference between the service attitude and the acquired power-safe attitude is reduced and the return-to-service time is accordingly reduced.

The spacecraft's control processor (96 in FIG. 3B) preferably includes a star index with which it matches the stars in the star tracker's field-of-view and makes an identification. From this identification and the known relationship between the star tracker's field-of-view and the body-fixed coordinate system, the control processor determines the spacecraft's power-safe attitude. This identification process is facilitated by obtaining stars of sufficient magnitude in the field-of-view. This is a function of each star tracker but an exemplary set of identifiable stars may be defined to be a set that includes a bright pair of stars having a magnitude of 5 or greater and that further includes at least two additional stars whose magnitude exceeds 6.

Reacquiring the spacecraft's service attitude requires that the spacecraft's control processor not only have determined the power-safe attitude but have knowledge of the spacecraft's ephemeris, i.e., its current position in its orbit about the Earth. If necessary, the ephemeris data (e.g., the orbit's inclination, right ascension of the ascending node, eccentricity, perigee argument and angle between perigee and the spacecraft) may be obtained from an Earth station via the spacecraft's communication antennas (78 in FIG. 3A).

The methods of the invention necessarily include the process of avoiding intrusion of the star tracker 70 of FIG. 6A. Intrusion not only includes partial or complete blockage of the field-of-view by spacecraft structures and local celestial bodies but also includes reflection of sun light into the star tracker's detection elements (e.g., CCD elements).

In the absence of intrusion, the star tracker's signals will comprise detected light sources against a black background (i.e., a background having an absence of detected light sources). In the presence of blockage, the star tracker's signals will show an absence of detected stars and in the presence of reflection, the star tracker's signals will not comprise a black background. Thus, the star tracker's signals enable the control processor (with its star catalog) to determine when blockage and intrusion have occurred.

It was stated above that tilting the line-of-sight 72 of the primary star tracker 70 approximately 55° upward from the yaw-roll plane (see FIGS. 3A and 3B) is a particularly advantageous alignment for avoiding star tracker intrusion by local celestial bodies. It has been shown that when that alignment does cause intrusion, an opposite tilt (i.e., tilted downward approximately 55° from the yaw-roll plane) will avoid intrusion. Accordingly, another method embodiment of the invention includes the process steps of a) detecting intrusion of the Star tracker, and b) reversing the spacecraft's orientation along the wing axis. These steps effectively remove intrusion by celestial bodies.

The teachings of the invention can also be applied to a spacecraft with stowed solar wings such as the spacecraft 60S of FIGS. 8A and 8B. As shown in FIG. 8A, the spacecraft 60S is similar to the spacecraft 60 of FIG. 3B with like elements indicated by like reference numbers. FIG. 8B is a view of the top of the spacecraft of FIG. 8A. In the spacecraft 60S, however, the solar wings 65 have been converted to stowed solar wings 160 and 161 that lie on the upper and lower faces of the body 68 and present an array portion 162 of each solar cell array to be orthogonal to the pitch axis 44 (i.e., parallel to the yaw axis 42).

During a transfer orbit (e.g., the orbits 32 and 34 of FIG. 1), the spacecraft 60S is typically spun about the axis of its apogee motor (80 in FIG. 3C), i.e., it is typically spun about its yaw axis 42. Each array portion 162 necessarily has less area than its corresponding solar wing (65 in FIGS. 3A–3C) but the array portions generate sufficient array current for housekeeping operations during a transfer orbit (e.g., 32 or 34 of FIG. 1) if the spacecraft's spin axis is properly oriented.

The array portions 162 constantly sweep a horizon that is defined by the roll-pitch plane and generate a combined array current that resembles a rectified sinusoid (a pattern similar to the'solid-line pattern 131 of FIG. 7) wherein the peak of the sinusoid is a function of the relationship between the roll-pitch plane and the sun. The sinusoid will have a maximum amplitude when the roll-pitch plane is arranged to pass through the sun and a minimum (substantially zero) when a normal to the roll-pitch plane passes through the sun.

If the amplitude of the sinusoid is sufficiently high, the average array current will be sufficient to support the spacecraft's housekeeping operations during the transfer orbit. If the average array current is less than a predetermined threshold, a process step of the invention precesses (i.e., tilts) the spacecraft's spin axis (i.e., its yaw axis) from its initial orientation to an orientation that increases the average array current.

For example, if the initial orientation generated a zero average array current, an embodiment of the invention tilts the spacecraft's spin axis substantially 90 degrees to thereby maximize the average array current. In a second example in which the initial orientation generates an average array current that is less than a predetermined threshold current, another embodiment of the invention tilts the spacecraft's spin axis to a different orientation to realize a different array current. Even though this process may fail to obtain an average array current that exceeds the threshold, the different array current may be compared to the initial array current to determine which of the spin axes is closer to a final spin axis that will provide an average array current that exceeds the threshold.

That is, successive spin axes are selected, corresponding array currents are compared, the change of the array current is observed to determine a succeeding spin axis that will increase the array current and the spin axis is slewed to the succeeding spin axis. It has been determined that two selections are generally sufficient, i.e., selections of second and third orientations (after an initial orientation), to acquire a final orientation that obtains an average array current that exceeds the current threshold.

In another method embodiment of the invention, the final orientation is determined by providing the spacecraft with at least one star tracker that has a field-of-view and by determining orientations (e.g., the final orientation) with an identifiable set of stars in the field-of-view (e.g, simultaneously performing the determining step with the spin-axis slewing steps described above that acquire the orientations). Typical star trackers can obtain such an identifiable set as long as the spacecraft's spin rate is not excessive (e.g., less than 0.4 degree/second).

Spacecraft structures and methods have been described above which acquire and determine power-safe attitudes. Methods of the invention are particularly useful because they:

a) require only a single star tracker which is an attitude sensor that is often included in a spacecraft for other purposes in such cases, the invention does not require the addition of any sensors, b) monitor a simple parameter (i.e., wing current) to determine solar-wing power generation, c) comprise simple maneuvers, and d) in many cases, acquire a power-safe attitude that does not significantly differ from the spacecraft's service attitude to thereby reduce the spacecrafts return-to-service time.

Because they only require a star tracker, the methods of the invention reduce the number of attitude sensors that have typically been required for regaining service attitudes. In the case of spacecraft which include a star tracker to carry out their service operations, the invention acquires and determines power-safe attitudes without requiring the addition of any attitude sensor.

Although the invention's methods preferably, include the simple monitoring of wing current, they may equivalently monitor the power that is generated from the wing current.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method for acquiring and determining a power-safe attitude for subsequent return of a spacecraft to a service attitude, the method comprising the steps of:

providing said spacecraft with at least one star tracker that has a field-of-view and with at least one solar wing that is rotatable about a wing axis of said spacecraft and generates a wing current that is substantially proportional to a solar radiation intercepted by said solar wing and that acquires a maximum current when said solar wing is orthogonal to said solar radiation;

comparing said wing current to a predetermined wing-current threshold;

monitoring said field-of-view for the presence of an identifiable set of stars;

in response to a lack of an identifiable set of stars in said field-of-view and to said wing current failing to exceed said wing-current threshold, performing at least one of the steps of, a) at a rotation rate, rotating said solar wing about said wing axis; and b) at a slew rate, slewing said spacecraft about a slew axis that is tilted at least 30 degrees from said wing axis; and continuing at least one of said rotating and slewing steps to acquire a power-safe attitude in which said wing current exceeds said wing-current threshold and said field-of-view contains an identifiable set of stars which determines said power-safe attitude.

2. The method of claim 1, further including the step of urging said spacecraft from said power-safe attitude to said service attitude.

3. The method of claim 1, wherein said spacecraft orbits the earth which has a north-south axis and further including the step of urging said spacecraft from said-power-safe attitude to an attitude in which said wing axis is substantially aligned with said north-south axis.

4. The method of claim 1, wherein said slew rate is substantially slower than said rotation rate.

5. The method of claim 1, wherein said rotation rate is on the order of 0.5 degree per second and said slew rate is on the order of 0.05 degree per second.

6. The method of claim 1, further including the step of performing at least one of the steps of,
   a) orbiting said spacecraft about the earth which has a north-south axis;
   b) in response to an identifiable set of stars in said field-of-view and to said wing current failing to exceed said wing-current threshold, urging said spacecraft from the attitude determined from said identifiable set of stars to a power-safe attitude in which said wing axis is substantially aligned with said north-south axis to thereby obtain a wing current that exceeds said wing-current threshold; and
   c) in response to said wing current exceeding said wing-current threshold and to a lack of an identifiable set of stars in said field-of-view, successively incrementing said spacecraft about said slew axis by an angular increment to acquire a power-safe attitude that is determined by an identifiable set of stars in said field-of-view and that continues to obtain a wing current that exceeds said wing-current threshold.

7. The method of claim 6, wherein said angular interval has a magnitude substantially one-half that of said field-of-view.

8. The method of claim 6, wherein said angular interval has a magnitude substantially that of said field-of-view.

9. The method of claim 1, wherein said slewing step includes the step of slewing said spacecraft about at least one additional slew axis that is tilted at least 30 degrees from said wing axis to thereby acquire said power-safe attitude.

10. The method of claim 1, wherein said slew axis is tilted at least 60 degrees from said wing axis.

11. The method of claim 1, wherein said slew axis is tilted substantially 90 degrees from said wing axis.

12. The method of claim 1, wherein said wing-current threshold is at least 50% of said maximum current.

13. The method of claim 1, further including steps of:
   providing said spacecraft with an antenna that has a maximum gain directed along an antenna axis that is tilted at least 80 degrees from said wing axis; and
   selecting said slew axis to be substantially coaxial with said antenna axis.

14. The method of claim 1, wherein, said identifiable set of stars includes at least one star that has a magnitude of at least five.

15. The method of claim 1, wherein said slewing step includes the step of urging said spacecraft about said slew axis with thrusters.

16. The method of claim 1, wherein said slewing step includes the step of urging said spacecraft about said slew axis with momentum wheels.

17. The method of claim 1, wherein:
   said at least one solar wing-comprises first and second solar wings that are independently rotatable about said wing axis; and
   said rotating step includes the step of initially rotating said first and second wings in opposite directions.

18. The method of claim 1, further including the steps of:
   detecting intrusion of said star tracker; and
   reversing the orientation of said spacecraft along said wing axis to thereby avoid said intrusion.

19. A method for acquiring and determining a power-safe attitude for subsequent return of a spacecraft to a service attitude in an orbit about the earth which has a north-south axis, comprising the steps of:
   providing said spacecraft with at least one star tracker that has a field-of-view and with at least one solar wing that is rotatable about a wing axis of said spacecraft and generates a wing current that is substantially proportional to a solar radiation intercepted by said solar wing and that acquires a maximum current when said solar wing is orthogonal to said solar radiation;
   comparing said wing current to a predetermined wing-current threshold;
   monitoring said field-of-view for the presence of an identifiable set of stars; and
   performing at least one of the steps of,
      a) at a rotation rate, rotating said solar wing about said wing axis;
      b) at a slew rate, slewing said spacecraft about a slew axis that is tilted substantially 90 degrees from said wing axis;
      c) in response to an identifiable set of stars in said field-of-view and to said wing current failing to exceed said wing-current threshold, urging said spacecraft from the attitude determined from said identifiable set of stars to a power-safe attitude in which said wing axis is substantially aligned with said north-south axis to thereby obtain a wing current that exceeds said wing-current threshold; and
      d) in response to said wing current exceeding said wing-current threshold and to a lack of an identifiable set of stars in said field-of-view, successively incrementing said spacecraft about said slew axis by an angular increment to acquire a power-safe attitude that is determined by an identifiable set of stars in said field-of-view and that continues to obtain a wing current that exceeds said wing-current threshold;
   until a power-safe attitude is obtained in which said wing current exceeds said wing-current threshold and said field-of-view contains an identifiable set of stars which determines said power-safe attitude.

20. The method of claim 19, further including the step of urging said spacecraft from said power-safe attitude to said service attitude.

21. The method of claim 19, wherein said slew rate is substantially slower than said rotation rate.

22. The method of claim 19, wherein said angular interval has a magnitude that does not exceed said field-of-view.

23. The method of claim 19, wherein said wing-current threshold is at least 50% of said maximum current.

24. The method of claim 19, wherein said identifiable set of stars includes at least one star that has a magnitude of at least five.

25. A spacecraft that can acquire and determine a power-safe attitude for subsequent return of a spacecraft to a service attitude, the spacecraft comprising:

a spacecraft body;

at least one solar wing that is rotatable about a wing axis of said body and generates a wing current that is substantially proportional to a solar radiation intercepted by said solar wing and that acquires a maximum current when said solar wing is orthogonal to said solar radiation;

at least one star tracker having a field-of-view and coupled to said body;

a control processor;

a wing actuator responsive to said processor for rotating said solar wing; and a torque generator coupled to said body and responsive to said processor for stewing, said spacecraft;

wherein said processor is programmed to perform the steps of:
- a) comparing said wing current to a predetermined wing-current threshold; and
- b) monitoring said field-of-view for the presence of an identifiable set of stars;
- c) in response to a lack of an identifiable set of stars in said field-of-view and to said wing current failing to exceed said wing-current threshold, performing at least one of the steps of,
  1) at a rotation rate, rotating said solar wing about said wing axis; and
  2) at a slew rate, slewing said spacecraft about a slew axis that is tilted at least 30 degrees from said wing axis; and
- d) continuing steps a, b and c to acquire a power-safe attitude in which said wing current exceeds said wing-current threshold and said field-of-view contains an identifiable set of stars which determines said power-safe attitude.

26. The spacecraft of claim 25, wherein said processor is programmed to perform the step of urging said spacecraft from said power-safe attitude to said service attitude.

27. The spacecraft of claim 25, wherein said slew rate is substantially slower than said rotation rate.

28. The spacecraft of claim 25, wherein said spacecraft is in orbit about the earth which has a north-south axis and wherein said processor is programmed to perform at least one of the steps of,
- a) in response to an identifiable set of stars in said field-of-view and to said wing current failing to exceed said wing-current threshold, urging said spacecraft from the attitude determined from said identifiable set of stars to a power-safe attitude in which said wing axis is substantially aligned with said north-south axis to thereby obtain a wing current that exceeds said wing-current threshold; and
- b) in response to said wing current exceeding said wing-current threshold and to a lack of an identifiable set of stars in said field-of-view, successively incrementing said spacecraft about said slew axis by an angular increment to acquire a power-safe attitude that is determined by an identifiable set of stars in said field-of-view and that continues to obtain a wing current that exceeds said wing-current threshold.

29. The spacecraft of claim 25, wherein said angular interval has a magnitude that does not exceed that of said field-of-view.

30. The spacecraft of claim 25, wherein said slew axis is tilted substantially 90 degrees from said wing axis.

31. The spacecraft of claim 25, wherein said wing-current threshold is at least 50% of said maximum current.

32. The spacecraft of claim 31, wherein said identifiable set of stars includes at least one star that has a magnitude of at least five.

33. The spacecraft of claim 25, further including an antenna that has a maximum gain directed along an antenna axis that is tilted at least 80 degrees from said wing axis and wherein said slew axis is substantially coaxial with said antenna axis.

34. The spacecraft of claim 25, wherein said torque generator comprises at least one thruster coupled to said body.

35. The spacecraft of claim 25, wherein said torque generator comprises at least one momentum wheel coupled to said body.

* * * * *